W. H. TRISSLER.
PRESERVING FRUIT.
No. 65,844. Patented June 18, 1867.
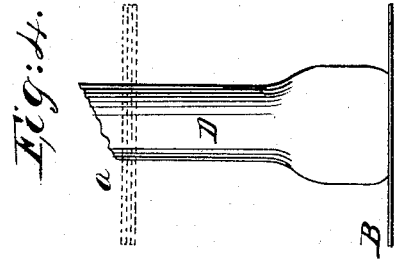
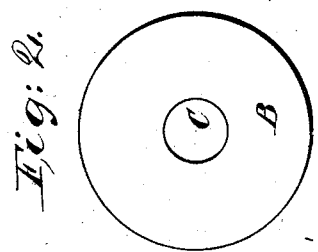 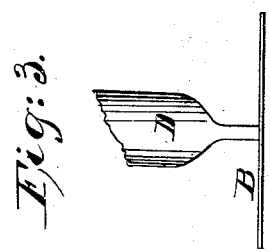
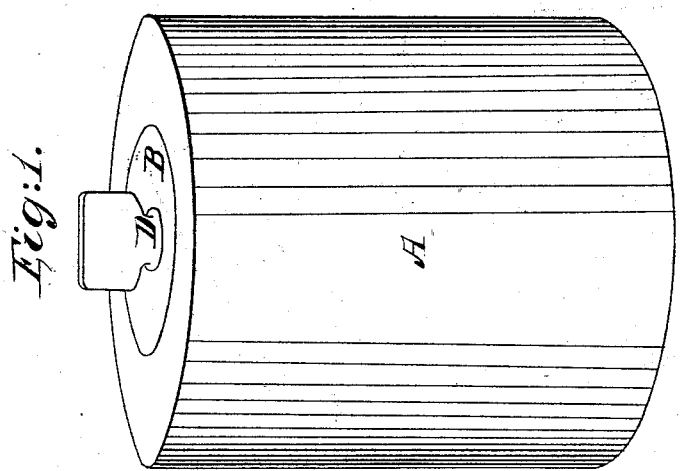
Witnesses:
J. Holmes
Frank S Alden.
Inventor:
William H. Trissler

United States Patent Office.

W. H. TRISSLER, OF CLEVELAND, OHIO.

Letters Patent No. 65,844, dated June 18, 1867.

---

IMPROVEMENT IN PRESERVING FRUIT.

---

*The Schedule referred to in these Letters Patent and making part of the same.*

---

TO ALL WHOM IT MAY CONCERN:

Be it known that I, WILLIAM H. TRISSLER, of Cleveland, in the county of Cuyahoga, and State of Ohio, have invented certain new and useful improvements in the Mode of Preserving Fruit; and I do hereby declare that the following is a full and complete description of the same, reference being had to the accompanying drawings, making a part of this specification, in which—

Figure 1 is a perspective view of the can.

Figures 2, 3, and 4, are detached sections to which reference will be made.

Like letters refer to like parts in the views.

A, fig. 1, represents an ordinary fruit-can, of which B, fig. 2, is the small plate by means of which the hole in the top of the can is closed, after being filled and ready for sealing up. Through the centre of this plate is a small hole, C, in which is fitted and soldered a lead pipe, D, fig. 4, or one of other suitable material. The usual process of canning fruit is to place the filled can in hot water for the purpose of expelling the air. This heating process is not only an inconvenient one, but is often attended with imperfect success, as the air is not always and cannot be wholly exhausted from the can by heating it in this way. It also injures the fruit by partially cooking it, thus destroying its flavor and freshness, a quality very necessary to retain in the preserved fruit.

In order to avoid these difficulties, and retain the full flavor and freshness of the live fruit, the air is exhausted from the can by an air-pump as follows: The can on being filled, the top or plate to which the pipe is soldered, is then placed over the hole in the top of the can and soldered down in the ordinary way. This being done, the pipe is then attached to an air-pump, and by means of which the air is wholly exhausted from the can. A pair of strong pincers is then applied to the pipe close to the plate or top, and the pipe is then compressed together, as shown in fig. 3, thereby closing the hole in the can perfectly tight. The uncompressed section of the pipe is then cut off, leaving only a short flattened end projecting from the top of the can, as seen in fig. 1. For further security against the entrance of air through the pipe, a soldering-iron may be drawn across the top of the compressed end, and thus fusing the sides of the pipe, thereby hermetically sealing it. It will be evident that by this process the air can be exhausted from the can more completely than it can be done by heating; hence the fruit will keep longer and better; also, there being no heat applied to the fruit, it therefore receives no injury by destroying its flavor, freshness, and texture, which is always the consequence of canning fruit in the ordinary way. Most fruits of a light and delicate color, when put up, turn dark, thus losing their natural color. In order to prevent this result, a small piece of charcoal is placed upon the top of the fruit before sealing the can; this serves as an absorbent, and acts as an antiseptic, and preserves to the fruit their color unchanged. In preparing the plate for the can, a number of them can be placed on the pipe, as indicated by the dotted line a, fig. 4, thus placing them conveniently to the hand of the operator.

What I claim as my improvement, and desire to secure by Letters Patent, is—

The pipe D and plate B as arranged, in combination with the can A, when used for the purpose and in the manner described.

W. H. TRISSLER.

Witnesses:
W. H. BURRIDGE,
J. HOLMES.